United States Patent
Mizuno

(10) Patent No.: US 7,386,479 B2
(45) Date of Patent: Jun. 10, 2008

(54) CONTENT SALES SITE AND PROGRAM

(75) Inventor: Shigehiko Mizuno, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 686 days.

(21) Appl. No.: 10/215,153

(22) Filed: Aug. 8, 2002

(65) Prior Publication Data

US 2003/0033223 A1 Feb. 13, 2003

(30) Foreign Application Priority Data

Aug. 9, 2001 (JP) ............................. 2001-242911

(51) Int. Cl.
G06Q 30/00 (2006.01)
(52) U.S. Cl. ....................................................... 705/26
(58) Field of Classification Search .................. 705/26, 705/27
See application file for complete search history.

(56) References Cited

U.S. PATENT DOCUMENTS

| 6,782,551 | B1 * | 8/2004 | Entwistle ...................... 725/46 |
| 6,947,900 | B2 * | 9/2005 | Giordano, III et al. ....... 705/26 |
| 2003/0163390 | A1 * | 8/2003 | Yang ............................ 705/27 |

FOREIGN PATENT DOCUMENTS

| EP | 1100035 A1 | 4/2000 |
| JP | 5-4087 | 6/1993 |
| JP | 7-129604 | 5/1995 |
| JP | 10-149388 | 6/1998 |
| JP | 10-162071 | * 6/1998 |

OTHER PUBLICATIONS

Bharat Rao "Emerging Business Models in Online Commerce", Institute for Technology and Enterprise, Polytechnic University, Dec. 12, 1999.*

* cited by examiner

Primary Examiner—Naeem Haq
(74) Attorney, Agent, or Firm—Morrison & Foerster LLP

(57) ABSTRACT

A searching section V3 of a content sales site 1 searches a content database V2 in accordance with search conditions inputted in a search condition inputting section M5 and generates an offerable content list. A checking section V4 refers to an owned content list UL stored in an owned content list storage section V1 in order to detect content items owned by a user from the offerable content list. A display information generating section V5 adds to the detected content items in the offerable content list the information indicating that the detected items have been already owned, generates display data of the offerable content list, and transmit it to electronic musical apparatuses 2 to 4. A charging processing section V6 refers to the owned content list UL, so that distribution of owned content items may be discounted or offered without charge. As a consequence, users can prevent unnecessary repurchase of owned content items, while users' convenience of intended repurchase from the content sales site 1 is facilitated. In addition, information on offering content items can be managed easily and reliably.

16 Claims, 11 Drawing Sheets

FLOW CHART OF THE FIRST EMBODIMENT [1]

EXAMPLE CONFIGURATION
OF OWNED CONTENT LIST

EXAMPLE HIT LIST

FLOW CHART OF THE FIRST EMBODIMENT [1]

FLOW CHART OF THE FIRST EMBODIMENT [2]

FLOW CHART OF THE FIRST EMBODIMENT
[3]

CHARGING PROCESSING

FLOW CHART OF THE SECOND EMBODIMENT

CONTENT SALES SITE AND PROGRAM

BACKGROUND OF THE INVENTION

1. Field of the Invention

The present invention relates to a content sales site and a program applied to the content sales site.

2. Description of the Related Art

There exist web sites which online-market to users various data including MIDI data, electronic musical score data, incoming-call melody data, and karaoke data (hereafter referred to as "content"). When users purchase content items from those web sites, users find it inconvenient to manage purchased content items as the number of them increases. Such inconvenience could cause users to repurchase unnecessary content items which they have already purchased. It could also cause them to buy content items which have been preset in their terminal device such as electronic musical instrument or mobile communication terminal device (hereafter referred to as "electronic musical apparatus"). As a result, such situations make users pay for unnecessary content items.

In Japanese Non-examined Patent Publication No. 07-129604 (Hiuka Sangyo KK, System Gijutsu Kenkyusho KK), there is disclosed a system entitled "REMOTE LIBRARY SYSTEM FOR PURCHASED ELECTRONIC BOOK DATA". According to this system, once a user purchases an electronic book data object from an electronic book data supply center, the center records the data object in a catalog listing all data objects that the user has purchased. When the user requests the catalog, it is sent from the center to the user's electronic book. From among the data objects listed in the catalog, the user selects one of purchased electronic book data objects to be transferred from the center to the user's electronic book. By following above procedure, the user can record a purchased electronic book data object on his/her electronic book any number of times.

That is, the user can use the electronic book center as storage space which stores purchased electronic book data objects and retrieve a desired object at any time. This usage serves to reduce storage space of the electronic book and to prevent one object from being stored in plural spaces. On purchasing a new data object, however, there arises an inconvenience that the user cannot make a judgement whether the user has already owned it until the user requests the purchased data catalog in order to confirm that it is not in the catalog.

Another related art is a system for retrieving content items, which is entitled "INFORMATION PROCESSOR, INFORMATION PROCESSING METHOD AND PROVIDING MEANS" (Japanese Non-examined Patent Application No. 2000-293586: SONY CORP). According to this system, information on content items which a user purchased from content providers is retained by the user's device (a receiver in the user's network). If the user re-purchases a content item which the user has already owned, the user is charged at a reduced price which is set by the user's device.

This system can serve to reduce prices of content items which are repurchased. In this system, however, prices have to be set by users' devices which manage information. Users' devices also have to check whether frauds such as information tampering are perpetrated or not. As a result, this system causes inconvenience that these loads placed on users' devices complicate the device configuration.

SUMMARY OF THE INVENTION

In light of the foregoing situation, it is an object of the present invention to provide a content sales site which prevents users from unnecessarily repurchasing content items that they have already owned, improves user convenience in intentionally repurchasing owned content items, and ensures easy and reliable information management on offering content items. Another object of the present invention is to provide a content sales program to be applied to the content sales site.

The feature of the present invention is that the content sales site which is connected to electronic musical apparatuses over a communication network with their communication each other being allowed and is provided with an owned content list memory for storing an owned content list comprised of owned content information describing content items owned by each user of the electronic musical apparatuses. The content sales site generates an offerable content list comprised of offerable content information describing offerable content items, refers to the owned content list of a user to detect offerable content information which describe the owned content items of the user of an electronic musical apparatus from among the offerable content list, adds owned information to the detected offerable content information to generate display data for displaying the offerable content list, wherein the owned information indicate that the content items have been already owned by the user, and transmits the generated display data to the electronic musical apparatus.

In this case, the content sales site may be further provided with a content database which stores a plurality of content items and may search the content items stored in the content database for offerable items in response to a request from the electronic musical apparatus in order to obtain offerable content information which describe the hit content items by this search.

This enables an electronic musical apparatus (user's side) to know whether each item of offered content items has been already owned by the user. Therefore, the user can avoid unnecessary repurchase of a content item which the user has already owned.

Another feature of the present invention is that the content sales site which is connected to electronic musical apparatuses over a communication network with their communication each other being allowed and is provided with an owned content list memory for storing an owned content list comprised of owned content information describing content items owned by each user of the electronic musical apparatuses. The content sales site refers to an owned content list to determine whether a content item to be offered is among content items which have been already owned by the user of the electronic musical apparatus. When the item to be offered is determined to be an owned one, the content sales site performs such charging processing that the content item is distributed to the electronic musical instrument at a discounted price or without charge.

The content sales site may search a plurality of content items stored in a content database for an item to offer in response to a request from the electronic musical apparatus.

The feature enables the content sales site to re-offer content items which have been already owned by a user of an electronic musical apparatus at a discounted price or without charge. Therefore, if the user has lost his/her content items by renewal of his/her electronic musical apparatus or his/her erroneous operation, etc., the user can regain the content items at a discounted price or without charge. In addition, since information is managed by the server side, the configuration of the electronic musical apparatuses (user side) can be simplified.

Furthermore, the other feature of the present invention is that the content sales site further obtains owned content information of content items stored in electronic musical apparatuses and generates an owned content list based on the obtained owned content information.

This feature enables the content sales site to add to the owned content list the content information of preset content items in an electronic musical instrument or contents items which are obtained by means other than the content sales site.

DESCRIPTION OF THE PREFERRED EMBODIMENT

Hereafter, preferred embodiments of the present invention will be described with reference to the drawings. As the embodiments described below are merely examples of the present invention, various changes and modifications may be made in the invention without departing from the spirit and scope thereof.

[System Overview]

Figure 1:
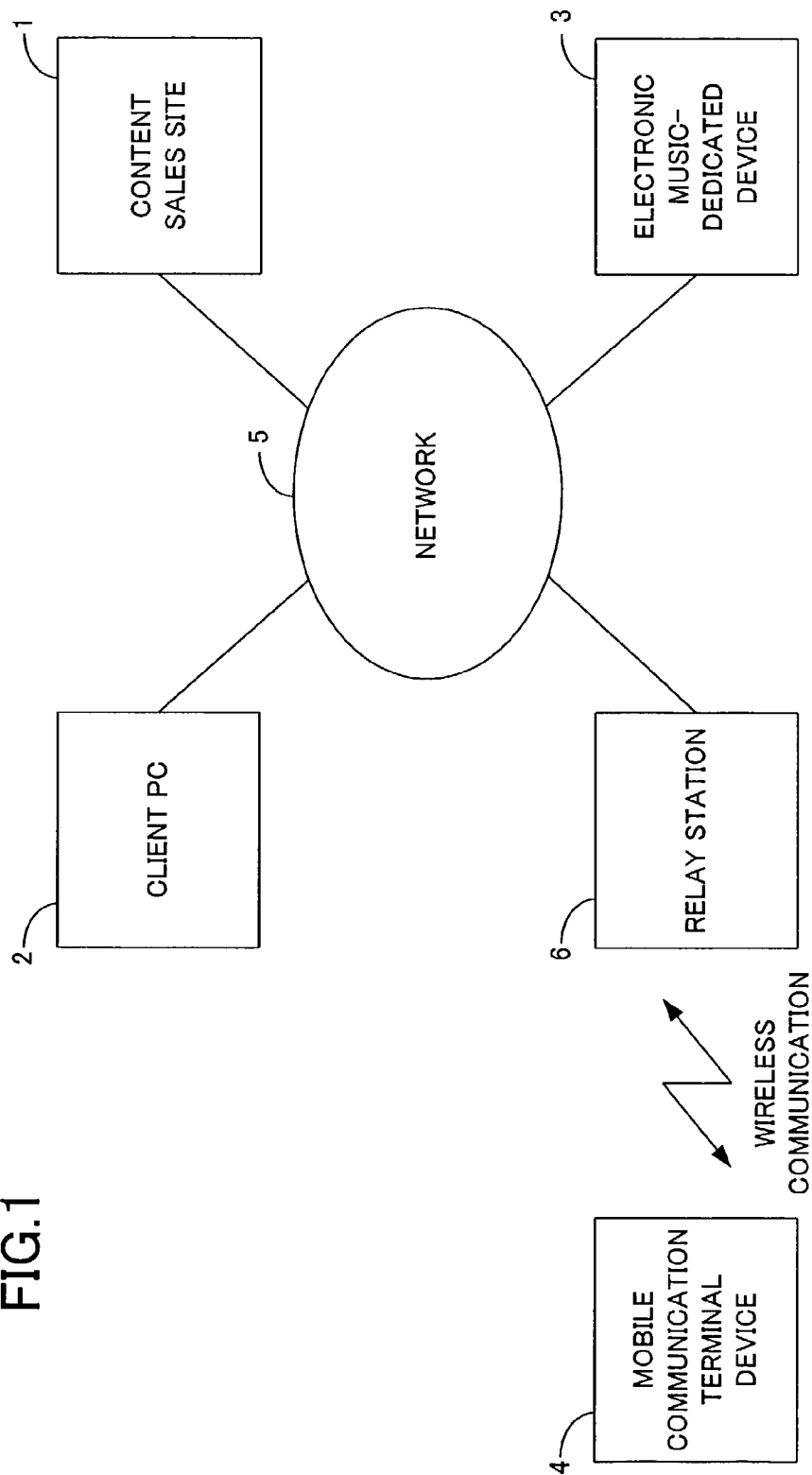
FIG. 1 is a schematic block diagram of a system showing the whole of a content sales system according to an embodiment of the present invention.

FIG. 1 is a schematic block diagram of a system showing a content sales system according to an embodiment of the present invention. In this embodiment, the system is comprised of a content sales site (also called a content sales server or a server computer) 1, an information processing device having communication capability such as a client personal computer (a client PC) 2 and an electronic music-dedicated device 3 including an electronic musical instrument, and a mobile communication terminal device 4 such as a mobile telephone. These constituent devices 1 to 4 are configured to communicate each other over a communication network 5 such as the Internet. The client PC 2 and the mobile communication terminal device 4 are provided with capability of processing electronic musical information. The client PC 2 and the mobile communication terminal device 4, together with the electronic music-dedicated device 3, are referred to as "electronic musical apparatus" or "musical information terminal device". Connected to the communication network 5 is a relay station 6, which communicates with the mobile communication terminal device 4 by radio wave in order to relay information signals transmitted/received between the mobile communication terminal device 4 and the other constituent devices 1 to 3 connected to the communication network 5.

The content sales site 1 is a server computer which functions as a content sales site having a capability of distributing electronic musical information (content) such as MIDI data, electronic musical score data, incoming-call melody data, and karaoke data which is used by the electronic musical apparatuses 2 to 4. The content sales site 1 may not be limited to a distributor of musical information, but may also serve as that of text information such as news or images such as standby screen. The content sales site 1 may also be a shopping site or an information-retrieval site.

[Hardware Configuration of the Content Sales Site]

Figure 2:
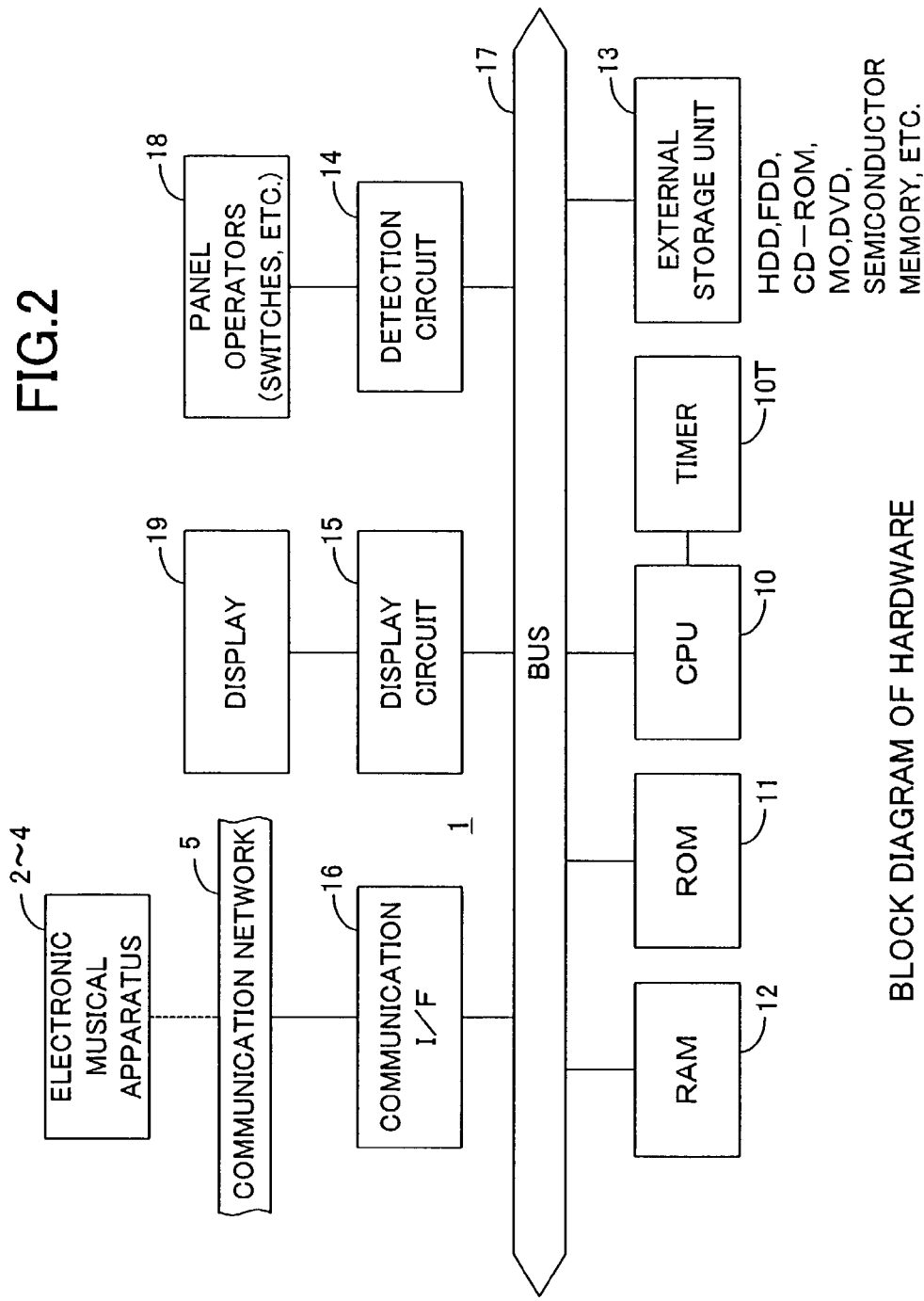
FIG. 2 is a block diagram showing a hardware configuration of a content sales site (a server computer) according to an embodiment of the present invention.

FIG. 2 is a block diagram showing a hardware configuration of the content sales site according to an embodiment of the present invention. In this embodiment, the content sales site 1 is provided with a central processing unit (CPU) 10, a read-only memory (ROM) 11, a random-access memory (RAM) 12, an external storage unit 13, a detection circuit 14, a display circuit 15, a communication interface (communication I/F) 16, etc. These devices 10 to 16 are linked each other through a bus 17.

The CPU 10 exercises various kinds of control in accordance with specified software programs using a clock of a timer 10T. Particularly, a predominant role played by the CPU 10 is to perform content sales processing for selling electronic musical information (content) such as MIDI data, electronic musical score data, incoming-call melody data, and karaoke data. In order to perform such processing, in the ROM 11 there are stored control programs including a content sales processing program. The RAM 12 stores various data and parameters necessary for various processes, and functions as a working area where various data in process is temporarily stored.

The external storage unit 13, which is comprised of not only a hard disk drive (HDD) but also storage devices using a transportable medium such as a compact disc-read-only memory (CD-ROM), a flexible disk (FD), a magneto-optical disk (MO), a digital versatile disk (DVD), a semiconductor memory, etc., stores content data and various data relating to content sale. Provided with the external storage unit 13, for example, are an owned content list storage section (V1) for storing a list of content items owned by each of the electronic musical apparatuses 2 to 4 ("owned content list" (UL)) and a content database (V2) for storing content items distributable to the electronic musical apparatuses 2 to 4. The external storage unit 13 may also store the content sales processing program.

Connected with the detection circuit 14 is a panel operator device 18 having various input operators such as switches. Connected with the display circuit 15 is a display 19. Connected with the communication I/F 16 may be the electronic musical apparatuses such as the client PC 2, the electronic music-dedicated device 3 and the mobile communication terminal device 4, with their communication each other being allowed.

[Hardware Configuration of Each Electronic Musical Apparatus]

Figure 3:
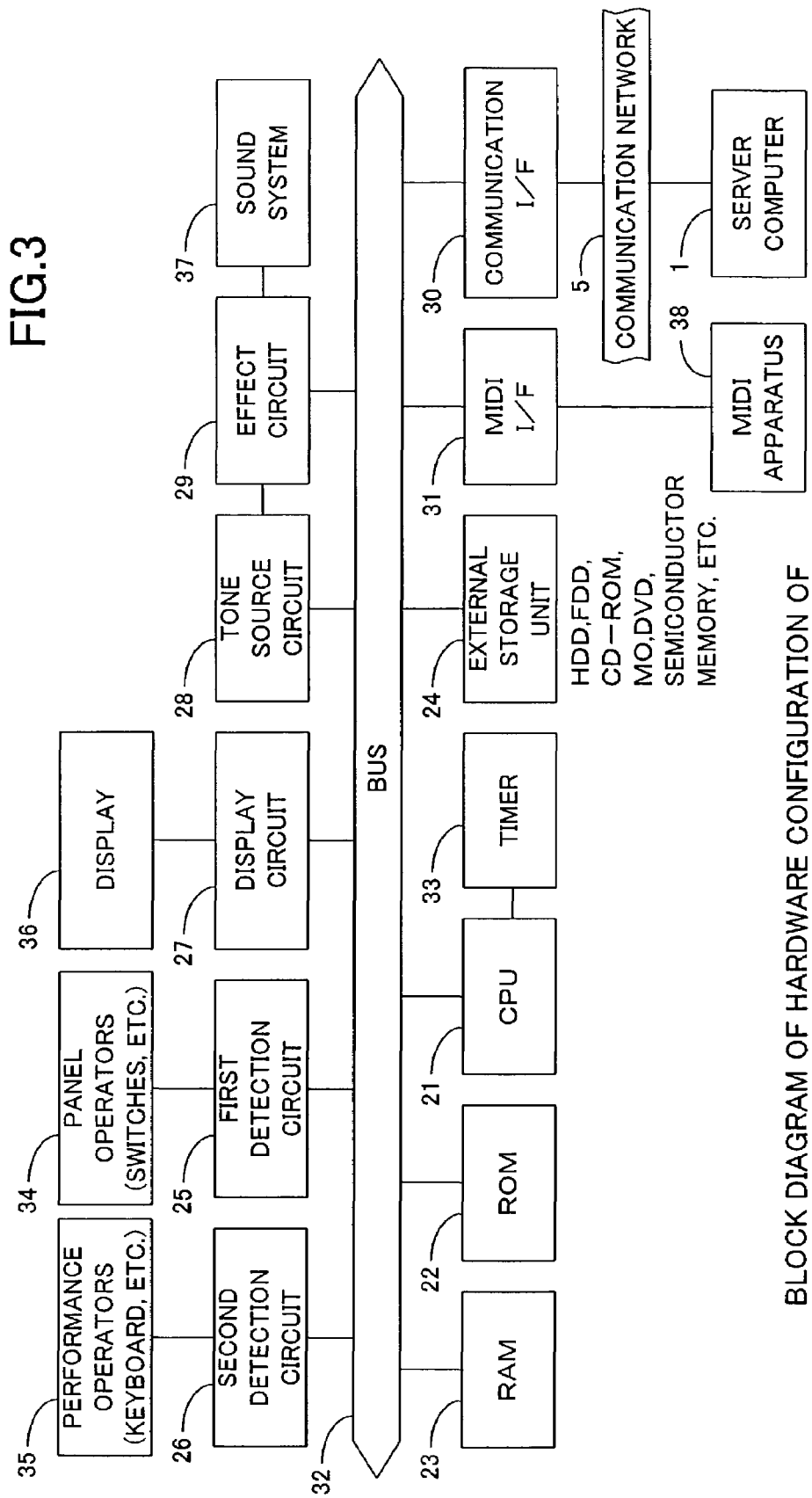
FIG. 3 is a block diagram showing a configuration of hardware such as client personal computer and electronic musical instrument according to an embodiment of the present invention.

FIG. 3 is a block diagram showing a hardware configuration of a musical information terminal device such as a client PC and an electronic musical instrument according to an embodiment of the present invention. In this embodiment, the musical information terminal device such as the client PC 2 or the electronic music-dedicated device 3 is provided with a CPU 21, a ROM 22, a RAM 23, an external storage unit 24, a first detection circuit 25, a second detection circuit 26, a display circuit 27, a tone source circuit 28, an effect circuit 29, a communication I/F 30, a MIDI interface (MIDI I/F) 31, etc. These devices 21 to 31 are linked each other through a bus 32.

The CPU 21 plays a pivotal role in exercising various kinds of control including musical information processing and content purchase processing in accordance with specified software programs using a clock of a timer 33. In order to perform such processing, in the ROM 22 there are stored control programs including a content purchase processing program. In the ROM 22 data such as musical information is also previously stored. The RAM 43 stores various data and parameters necessary for various processes and functions as a working area where various data in process is temporarily stored. The external storage unit 24, which is comprised of an hard disk drive HDD and drive devices using transportable storage medium such as CD-ROM, FD, MO disk, DVD, semiconductor memory, etc., stores musical information (content) used by the electronic musical apparatus (2, 3) to which the external storage unit 24 belongs. The external storage unit 24 can also store other data relating to purchase of a content item. It may also store the content purchase processing program.

The musical information previously stored in the ROM 22 and the external storage unit 24 of the electronic musical apparatus (2, 3) is called "preset content", while the musical information obtained later on and stored in the external storage unit 24 is called "purchased content". The ROM 22 functions as a preset content storage section (M1) for storing preset content items, and the external storage unit 24 functions as the preset content storage section (M1) for storing preset content items or a purchased content storage section (M2) for storing purchased content items.

The first detection circuit (panel operation detection circuit) 25 is for detecting setting/controlling operations done by panel operators 34 such as switches connected thereto and inputting the detected operation to the electronic musical apparatus (2, 3). The panel operators 34 are for setting operating conditions of the electronic musical apparatus (2, 3) and inputting various information necessary for communication with the content sales site 1. When the client PC 2 is used as an electronic musical apparatus, a keyboard and a pointing device such as a mouse of the client PC 2 are used as the panel operators 34 (in normal mode (setting/controlling mode)). When the electronic music-dedicated device 3 is used as an electronic musical apparatus, various switches provided on an operational panel are used as the panel operators 34.

The second detection circuit (performance operation detection circuit) 26 is for detecting performance operations by performance operators 35 such as keys on a keyboard connected thereto and inputting the detected performance operations to the electronic musical apparatus (2, 3). The performance operators 35 are used for inputting performance information in accordance with user's performance operations. When the client PC 2 is used as an electronic musical apparatus, performance operators 35 are served by predetermined keys on a keyboard in performance mode. When the electronic music-dedicated device 3 is used as an electronic musical apparatus, performance operators 35 are served by performance operators such as keys on a keyboard.

The display circuit 27 controls indications displayed on a display device 36 connected thereto in accordance with commands from the CPU 21. The display device 36 includes a display and various indicators.

Connected to the tone source circuit 28 is the effect circuit 29 which includes a DSP. Connected to the effect circuit 29 is a sound system 37 which includes D/A converters, amplifiers and speakers. These devices 28, 29 and 37 form a musical tone generating section which generates musical tones in accordance with musical information such as performance and distributed content.

The communication I/F 30 is provided for connecting the electronic musical apparatus (2, 3) with the content sales site 1 and the other electronic musical apparatuses (2 to 4), with their communication each other being allowed. For example, content items obtained from the content sales site 1 may be transmitted over the communication network 5 in order to be stored in the external storage unit 24. Connected to the MIDI I/F 31 is another electronic musical apparatus 38 which is capable of handling MIDI-formatted musical information, thereby making it possible to transmit/receive MIDI musical information.

The content sales site (server computer) 1 described in FIG. 2 may have the performance operators and detection circuit (35, 26), the musical tone generating means (28, 29, 37), and the MIDI I/F (31) as shown in FIG. 3.

Figure 4:
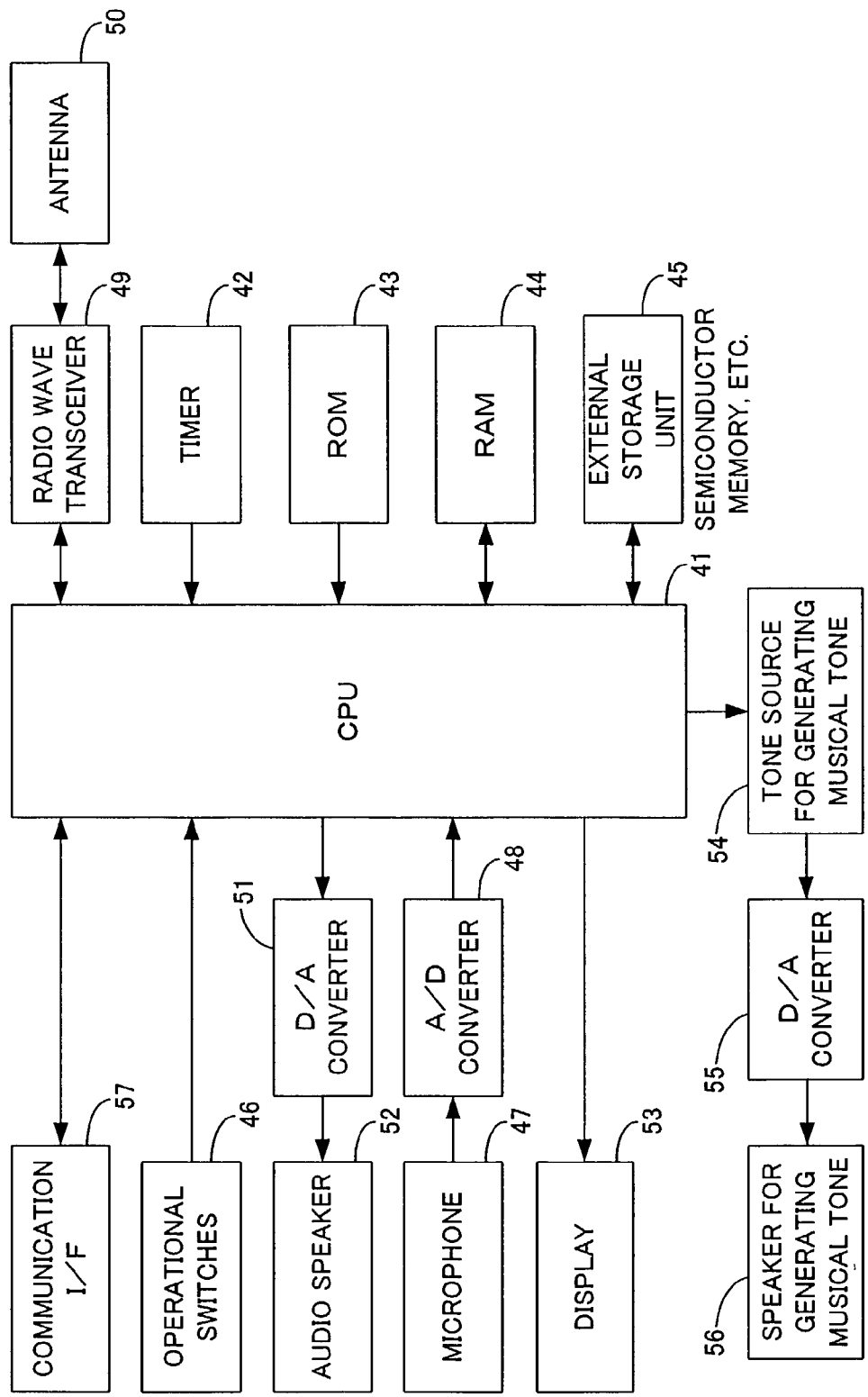
FIG. 4 is a block diagram showing a hardware configuration of a portable communication terminal device according to an embodiment of the present invention.

FIG. 4 is a bock diagram showing a hardware configuration of a portable communication terminal device according to an embodiment of the present invention. In this embodiment, the mobile musical information terminal device (mobile electronic musical apparatus) 4 such as a mobile communication terminal device is provided with a CPU 41 for conducting various processes including content purchase and controlling each part of the terminal device, a timer 42 for generating a clock used for the above control and processes, and various storage means such as a ROM 43 in which controlling programs and various data are stored, a RAM 44 which temporarily holds data used for the control and processes, and an external storage unit 45 which is comprised of storage media such as a semiconductor memory and stores data and programs. In the external storage unit 45 various data and programs for content purchase may be stored.

The musical information previously stored in the ROM 43 and the external storage unit 45 of the electronic musical apparatus is called "preset content", while the musical information obtained later on and stored in the external storage unit 45 is called "purchased content". Therefore, as the client PC 2 and the electronic music-dedicated device 3, the ROM 43 functions as a preset content storage section (M1) for storing preset content, while the external storage unit 45 functions as the preset content storage section (M1) for storing preset content or a purchased content storage section (M2) for storing purchased content.

As input means, the mobile musical information terminal device 4 is provided with operation switches 46 for inputting required information to a terminal system in accordance with cursor movements and click operations by operators including buttons, a microphone 47 for inputting user's voice, etc., and an A/D converter 48. A radio wave transceiver 49 controlled by the CPU 41 transmits/receives telephone speech signals and data signals to/from the relay station 6 by way of an antenna 50. Speech signals such as incoming telephone speech signals are controlled by the CPU 41 and passed through a D/A converter 51 to an audio speaker (receiver) 52 in order to be recognized as voice by a user.

On a display (e.g. LCD) 53 controlled by the CPU 41 there are displayed various operations of the mobile communication terminal device 4 including transmitting/receiving, visual information necessary for use of musical information, and musical information. The mobile communication terminal device 4 is also provided with a musical tone generating section which is comprised of a tone source 54 for generating musical tone, a D/A converter 55 and speaker (sounder) 56 for musical tone in order to play incoming-call melodies and karaoke pieces. In order to transmit/receive various data and programs to/from another information processing device which is not shown, a communication interface I/F 57 is also provided.

[Overview of the System Functions]

Figure 5:
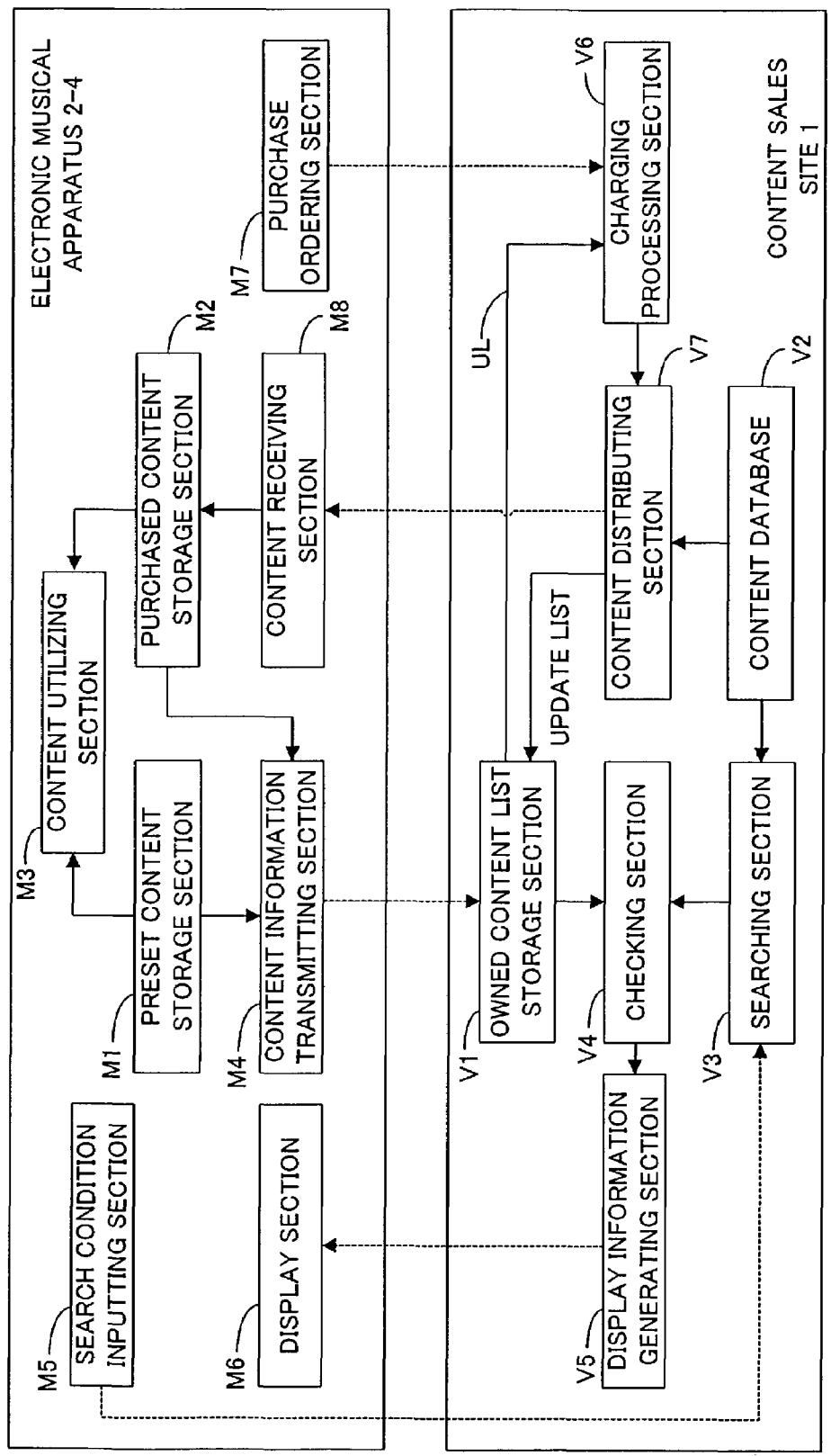
FIG. 5 is a schematic functional block diagram of a system according to an embodiment of the present invention.

In an embodiment of this invention, the electronic musical apparatuses 2 to 4 access the content sales site 1 so that content items are distributed to them. FIG. 5 is a schematic block diagram showing functions of the content sales system according to an embodiment of this invention. The system overview according to this invention will be briefly described with reference to FIG. 5.

In the content sales site 1 which is connected to the electronic musical apparatuses 2 to 4 over the communication network 5 with communication each other being allowed, the owned content list UL which lists all the content items owned by each user is stored in the owned content list storage section V1. The owned content list storage section V1 has a function of getting owned content information stored in the preset content storage section (M1) and the purchased content storage section (M2) of the electronic musical apparatuses 2 to 4 and generating the owned content list in accordance with the owned content information.

In the first embodiment, in response to a query made by a search condition inputting section M5 of the electronic musical apparatus (2 to 4), a searching section V3 searches the content database V2 in order to generate an offerable content list comprised of offerable content information describing offerable content items. A checking section V4 then refers to the owned content list UL in order to detect from the offerable content list the offerable content information which corresponds to user's owned content items stored in the electronic musical apparatus (2 to 4). Then, a display information generating section V5 adds to the offerable content information detected by the checking section V4 the owned information (MK) indicating that the user has already owned the detected content items and generates display data of the offerable content list. The data is then transmitted to the electronic musical apparatus (2 to 4).

In the second embodiment, a charging processing section V6 refers to the owned content list UL in order to determine whether the content item to be sold is among the owned content items of the user of the electronic musical apparatus. If so, a content distributing section V7 conducts such charging processing that the content item is offered to the electronic musical apparatus (2 to 4) at a discounted price or without charge.

The content sale according to an embodiment of the present invention will be described in more detail. The electronic musical apparatuses such as the client PC 2, the electronic musical instrument (electronic music-dedicated device) 3 and the mobile communication terminal device 4 which can handle electronic musical information, are provided with functional blocks including a preset content storage section M1, a purchased content storage section M2, a content utilizing section M3, a content information transmitting section M4, a search condition inputting section M5, a display section M6, a purchase ordering section M7, and a content receiving section M8.

In the preset content storage section M1 formed in the ROMs 22, 43 and the external storage units 24, 45 of the electronic musical apparatuses 2 to 4, there are stored preset content items which users have been allowed to use since the initial use of the electronic musical apparatuses. The preset content items stored in the electronic musical instrument 3 include music piece information for demonstration (demonstration pieces), while those stored in the mobile communication terminal device 4 include preset incoming-call melody information (preset incoming-call melodies).

In addition to the preset content storage section M1, the external storage units 24, 45 have the purchased content storage section M2, which stores purchased content items obtained after the electronic musical apparatuses 2 to 4 started to be used. The purchased content items include those purchased from the content sales site 1, but they may also include those purchased from means other than the content sales site 1 (e.g. content items in the form of media such as an FD purchased from an actual store).

Each content item such as a preset content item or a purchased content item includes heading information which represents an outline of the item. The heading information is called content information. The content information is comprised of data such as content number (content ID) assigned to each content item, genre, title, composer, lyric writer, and artist name, which are able to be used as a keyword for search. The content information of preset content items, purchased content items, or all the content items (owned content items) may be displayed on the displays 36, 53 in the form of a list. Among the data included in content information, users may choose data to display.

The content utilizing section M3 is a functional block for utilizing available content items stored in the storage sections M1, M2 in order to generate musical tones and display musical scores in combination with the musical tone generating sections 28, 29, 37; and 54 to 55 and the display means 27, 36; 53.

The content information transmitting section M4 is provided with a function of transmitting via the communication I/F 30 or the radio wave transceiver 49 and the antenna 50 to the content sales site 1 the owned content information (e.g. content number) of the electronic musical apparatuses 2 to 4 stored in the preset content and purchased content storage sections M1, M2 of the electronic musical apparatuses 2 to 4, on accessing the content sales site 1 from the electronic musical apparatuses 2 to 4.

The search condition inputting section M5 is provided with a function of designating a condition for a search which is performed on the side of the content sales site 1 in accordance with operations for inputting a search condition by the panel operators 34 or the operation switches 46 when a purchase of a content item is requested on the side of the electronic musical apparatuses 2 to 4. In order to perform such search, a keyword belonging to a category such as "genre", "title of music piece", "composer", "lyric writer", and "artist name" is input. A keyword may be input directly. It may also be input by choosing a desired keyword from among those organized by category in alphabetic sequence. A plurality of categories may be designated at one time.

The display section M6 is a functional block for displaying with the display means 27, 36, 53 a list of content items that satisfy the designated search condition. The content list is generated in accordance with the list display data transmitted from the content sales site 1. Owned content items in the list are labeled as such.

The purchase ordering section M7 is a functional block for specifying a content item to purchase from among listed items displayed on the displays 36, 53 in accordance with operation for inputting a desired item by the panel operators 34 or the operation switches 46. For example, a user specifies a desired content item by pointing with the operators 34, 46 at the purchase ordering button (PR) provided for each content item in the list.

The content receiving section M8 is a functional block which receives the ordered content item from the content sales site 1 and writes it into the purchased content storage section M2.

The content sales site 1, on the other hand, is provided with functional blocks including the owned content list storage section V1, the content database V2, the searching section V3, the checking section V4, the display information generating section V5, the charging processing section V6, and the content distributing section V7.

The owned content list storage section V1 of the content sales site 1 has a function of generating the owned content list (UL) in accordance with the owned content information transmitted from the electronic musical apparatuses 2 to 4 and storing the list (UL) at an owned content list storage area in the external storage unit 13. When the electronic musical apparatuses 2 to 4 purchase a new item distributed by the content distributing section V7, the content list storage section V1 also updates the owned content list (UL) in accordance with the content distribution by the content distributing section V7.

Figure 6:
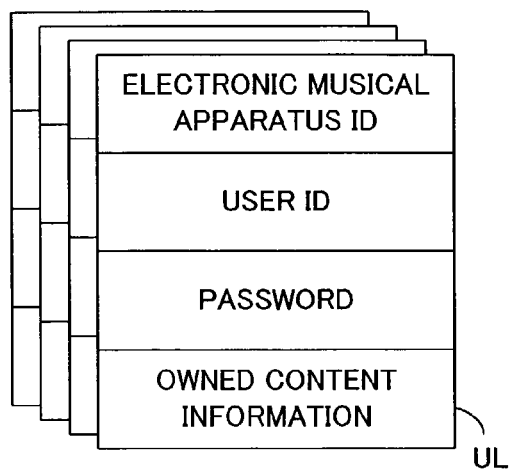
FIG. 6 is an illustration showing an example configuration of an owned content list according to an embodiment of the present invention.

FIG. 6 is an illustration showing an example configuration of an owned content list. As shown in the figure, an owned content list UL is prepared for each set which is comprised of an electronic musical apparatus ID given to each of the electronic musical apparatuses 2 to 4, a user ID and password given to each user. The electronic musical apparatus ID, the user ID and password are used for authentication at the second or later access. This authentication ensures security of the system. Owned content information comprising the owned content list UL includes keyword data such as content number (content ID), genre, title, composer, lyric writer, and artist name. If requested, data may be shown on the display 19 in the form of a list.

In the external storage unit 13 there is created the content database V2, which stores a multitude of content items along with corresponding content information. The searching section V3 searches the content database V2 for content items fulfilling a search condition sent from the electronic musical apparatus (2 to 4) and generates a list of the information of the retrieved content items. The list generated here is called a hit list or an offerable content list.

The checking section V4 checks the hit list (the offerable content list) generated in the searching section V3 against the owned content list UL stored in the content list storage section V1 and extracts matched items. In other words, owned content items included in the offerable content items are detected.

The display information generating section V5 generates the list display data to be displayed on the displays 36, 53 of the electronic musical apparatuses 2 to 4, referring to the offerable content list generated in the searching section V3. On generating the list display data, the display information generating section V5 refers to the check results obtained in the checking section V4 and adds "owned information" to the owned content information included in the offerable content list. The content information which is added the "owned information" are displayed with a letter or a symbol (MK) indicating that they have been already owned.

Figure 7:
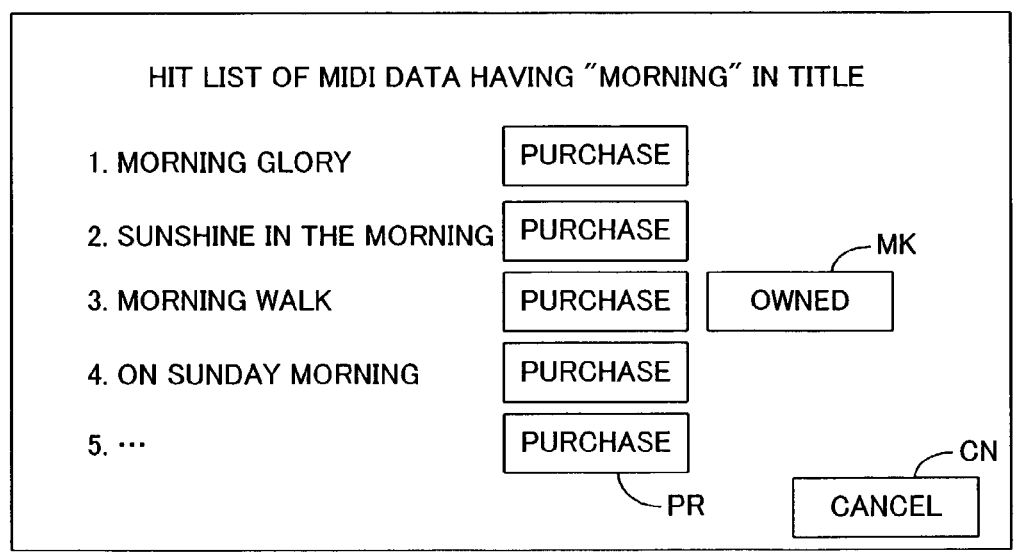
FIG. 7 is an illustration showing an example hit list according to an embodiment of the present invention.

FIG. 7 illustrates an example hit list which is displayed on the displays 36, 53 of the electronic musical apparatuses 2 to 4. The hit list is displayed in accordance with the list display data generated as described above. FIG. 7 is a case where the search condition inputting section M5 of the electronic musical apparatus (2 to 4) designates MIDI data including a word of "morning" in the title of music pieces. In this case, the content information (titles, in this case) of the offerable content list obtained in the searching section V3 is displayed along with purchase ordering buttons PR bearing a word of "purchase". Of the content items included in the offerable content list, furthermore, the "owned content items" which have been detected in the checking section V4 bear a word MK of "owned". The hit list is also provided with a cancel button CN so that a user can choose not to purchase any item when the hit list does not include the user's desired item.

The charging processing section V6 is a functional block for performing processing when the electronic musical apparatus (2 to 4) has ordered a content item. As shown by the line "UL" in FIG. 5, the charging processing section V6 checks the owned content list UL stored in the owned content storage section V1 in order to determine whether the ordered item is included in the owned content list UL. If it is included in the list, it may be offered at a discounted price or without charge (the second embodiment).

The content distributing section V7 then distributes online the ordered content item along with the corresponding content information to the electronic musical apparatus (2 to 4).

[The First Embodiment]

Figure 8:
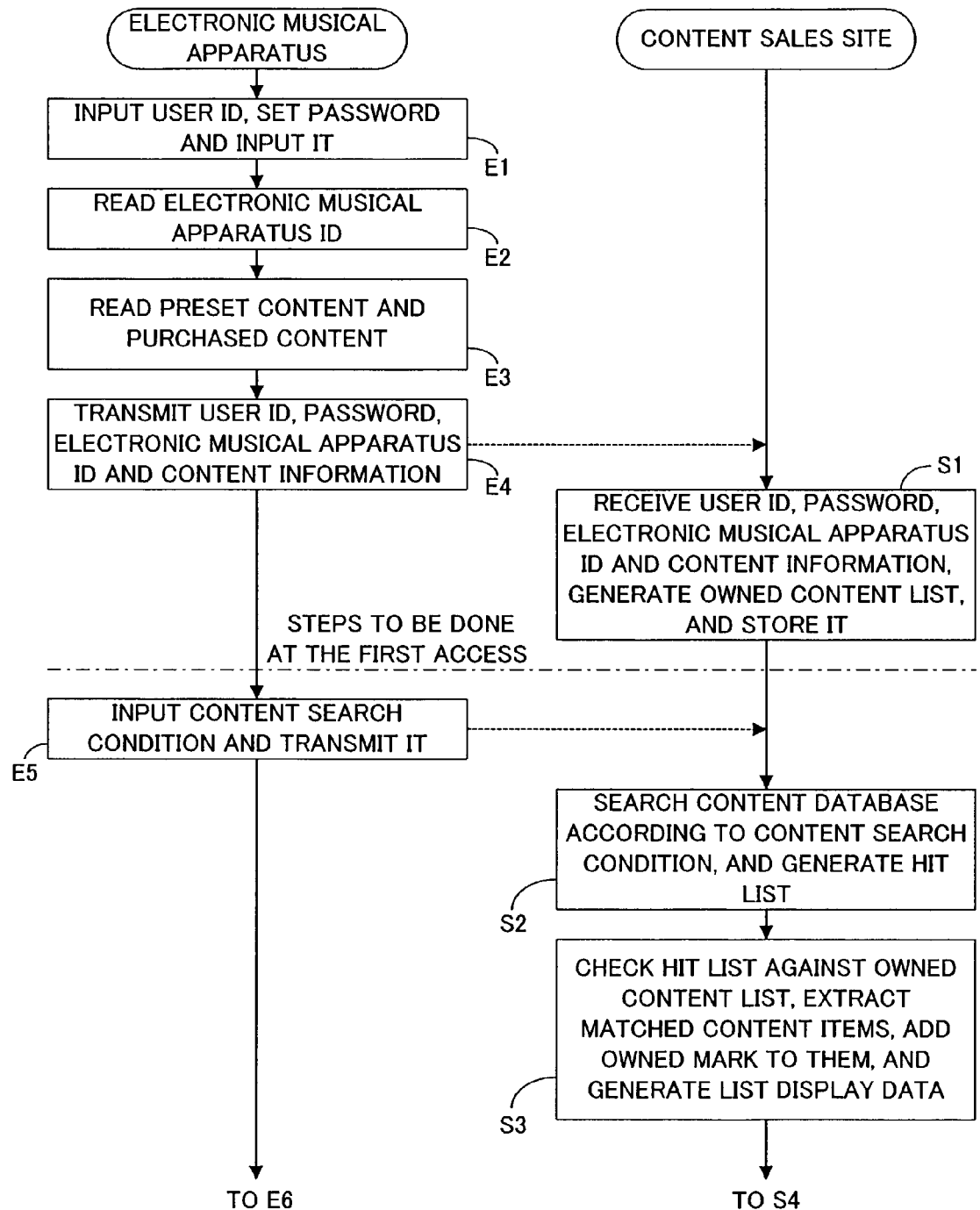
FIG. 8 is part of a flow chart showing content sales processing according to the first embodiment of the present invention.
Figure 9:
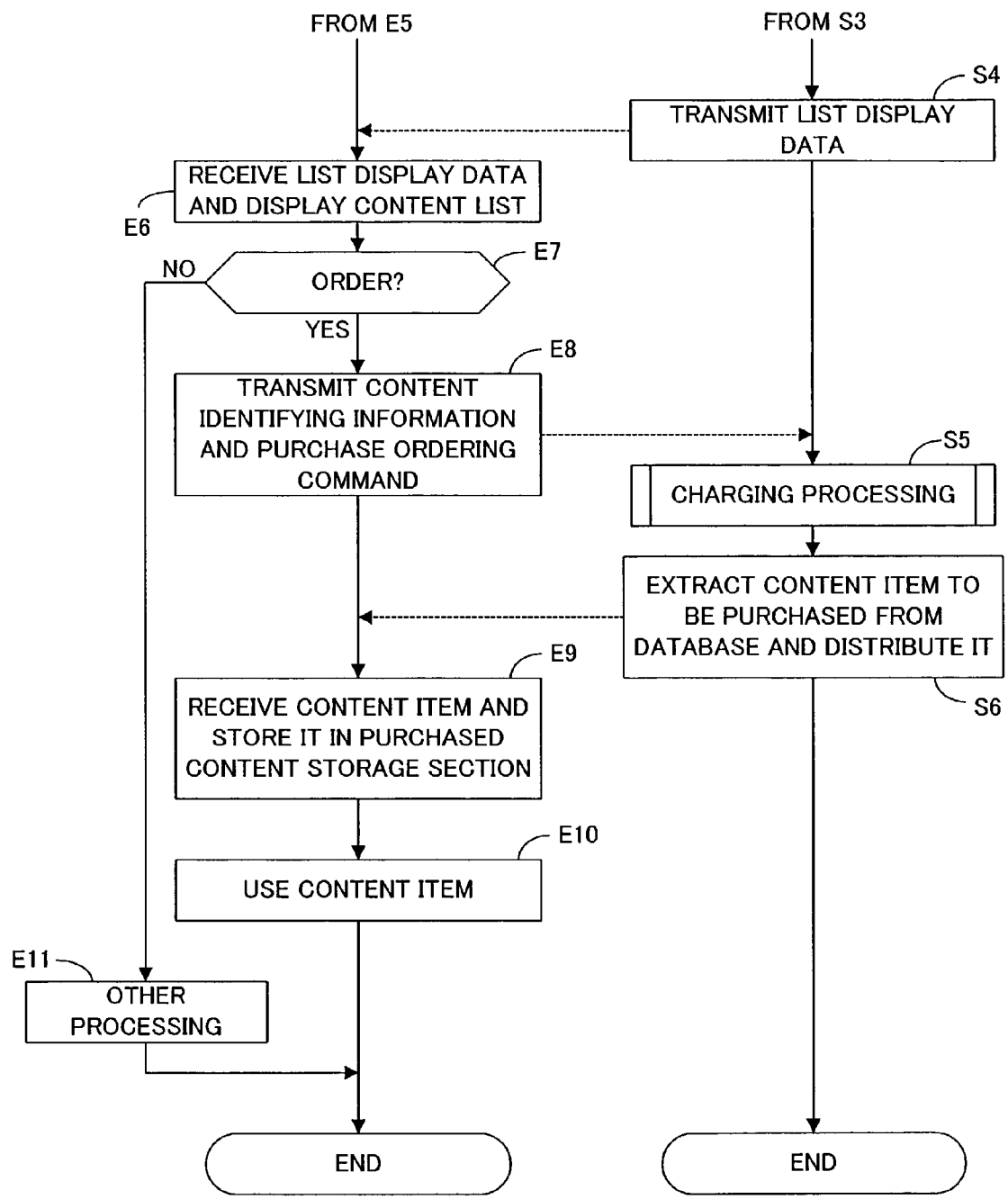
FIG. 9 is another part of the flow chart showing the content sales processing according to the first embodiment of the present invention.

FIGS. 8 to 11 are flow charts illustrating the content sales processing according to the first embodiment of the present invention. In FIG. 8 and FIG. 9, steps E1 to E4 performed by the electronic musical apparatuses 2 to 4 and a step S1 by the content sales site 1 are "processing to be performed at the first access" which is performed when the electronic musical apparatuses 2 to 4 access the content sales site 1 for the first time. Following the processing, steps E5, S2 and below are performed. Performed at the second or later access is "processing at the second or later access" shown in FIG. 10, which is followed by processes of steps E5, S2 and below shown in FIG. 8 and FIG. 9.

At the first access of an electronic musical apparatus to the content sales site 1, the panel operators 34 or predetermined operators of the operational switches 46 are operated according to predetermined operational procedures. First, according to the operational procedure for inputting a user ID, a user ID is input. According to the operational procedure for inputting a password, a password is set and input to the system (step E1). Next, according to the operational procedure for accessing the content sales site 1, an electronic musical apparatus ID which has been preset to the apparatus is read from the ROM 22, 43 (step E2). Then, the content information of preset content items and purchased content items is read from the preset content and purchased content storage sections M1, M2 (step E3). The user ID, the password, the electronic musical apparatus ID and the required content information (e.g. content number) are transmitted to the content sales site 1 by the function of the content information transmitting section M4 (step E4).

The content sales site 1 receives the user ID, the password, the electronic musical apparatus ID, and the content information transmitted from the electronic musical apparatus, generates an owned content list UL, and stores it at the owned content list storage area in the external storage unit 13 by the function of the owned content list storage section V1 (step S1).

In the electronic musical apparatus, when the operation of inputting a content search condition is performed by the operators 34, 46, the content search condition according to the input operation is input to the system and transmitted to the content sales site 1 by the function of the content search condition inputting section M5 (step E5).

In the content sales site 1, by the function of the searching section V3, the content database V2 is searched according to the content search condition set by the electronic musical apparatus, and a hit list is generated (step S2). That is, in the searching section V3 an offerable content list bearing heading information of offerable content items (offerable content information) extracted in accordance with the search condition is generated and passed to the checking section V4.

In the checking section V4, the offerable content information in the passed offerable content list (the hit list) is checked against the owned content information in the owned content list UL in order to extract (detect) content information that matches the list UL from the offerable content list. In the display information generating section V5, furthermore, the owned information (information to be added in order to display an additional code of mark MK) is added to the extracted (detected) content information in the offerable content list, and the list display data is generated (step S3). The list display data generated thereby is transmitted from the display information generating section V5 to the electronic musical apparatus (step S4 in FIG. 9).

The electronic musical apparatus which has received the list display data from the content sales site 1 displays the content list on the display 36, 53 by the function of the display section M6 (step E6 in FIG. 9), and on the display showing the content list, asks the user whether he/she places an order (step S7). That is to say, by adding a purchase ordering button PR to each of the listed items, the display showing the content list suggests to the user that the listed content items are offerable. In the display showing the content list, moreover, an owned mark MK is added to those content items which have already been owned by the electronic musical apparatus, based on the owned information. The owned mark MK serves to remind the user that he/she has already owned the items with the MK mark.

If the operators 34, 46 are operated by the user so as to click the purchase ordering button PR corresponding to a desired content item, the order of the item is input to the electronic musical apparatus (2 to 4) (E7→YES). Then by the function of the purchase ordering section M7, content identifying information (e.g. content number) and a purchase ordering command are transmitted to the content sales site 1 (step E8).

In the content sales site 1 which has received the content identifying information and the purchase ordering command from the electronic musical apparatus, the charging processing (described in detail later with reference to FIG. 11) is performed by the function of the charging processing section V6 (step S5). After the charging processing, by the function of the content distributing section V7, the ordered content item is extracted from the database V2 and distributed to the electronic musical apparatus. Also, the owned content list storage section V1 is controlled so that the owned content list UL stored in the owned content list storage area (13) is updated (step S6). Then the processing in the content sales site 1 is terminated.

In the electronic musical apparatus, the content item distributed from the content sales site 1 is received by the content receiving section M8, and is stored in the purchased content storage section M2 (step E9). Then by the function of the content utilizing section M3, the content item stored in the purchased content storage section M2 is used (step E10), and the processing on the side of the electronic musical apparatus is terminated. The use of a content item at step E10 includes generation of musical tone and display of musical score in the musical tone generating sections 28, 29, 37, 54 and 55 and the display means 27, 36 and 53.

In the meanwhile, if a cancel button CN is selected by user's operation of the operators 34, 46 due to the absence of his/her desired content item among those listed on the display, the cancellation of purchase of the listed content items is input to the system (E7→NO). Then the other processing may be performed (step E11). The other processing includes a process for test-listening/test-watching musical score/lyric data and a process for returning to the step for inputting a content search condition (step E5) in order to repeat the above steps (S2 to S4; E6 to E7). After the other processing (E11), the processing on the side of the electronic musical apparatus is terminated. In response to the termination of the processing of the electronic musical apparatus, the processing on the side of the content sales site 1 is also terminated.

Figure 10:
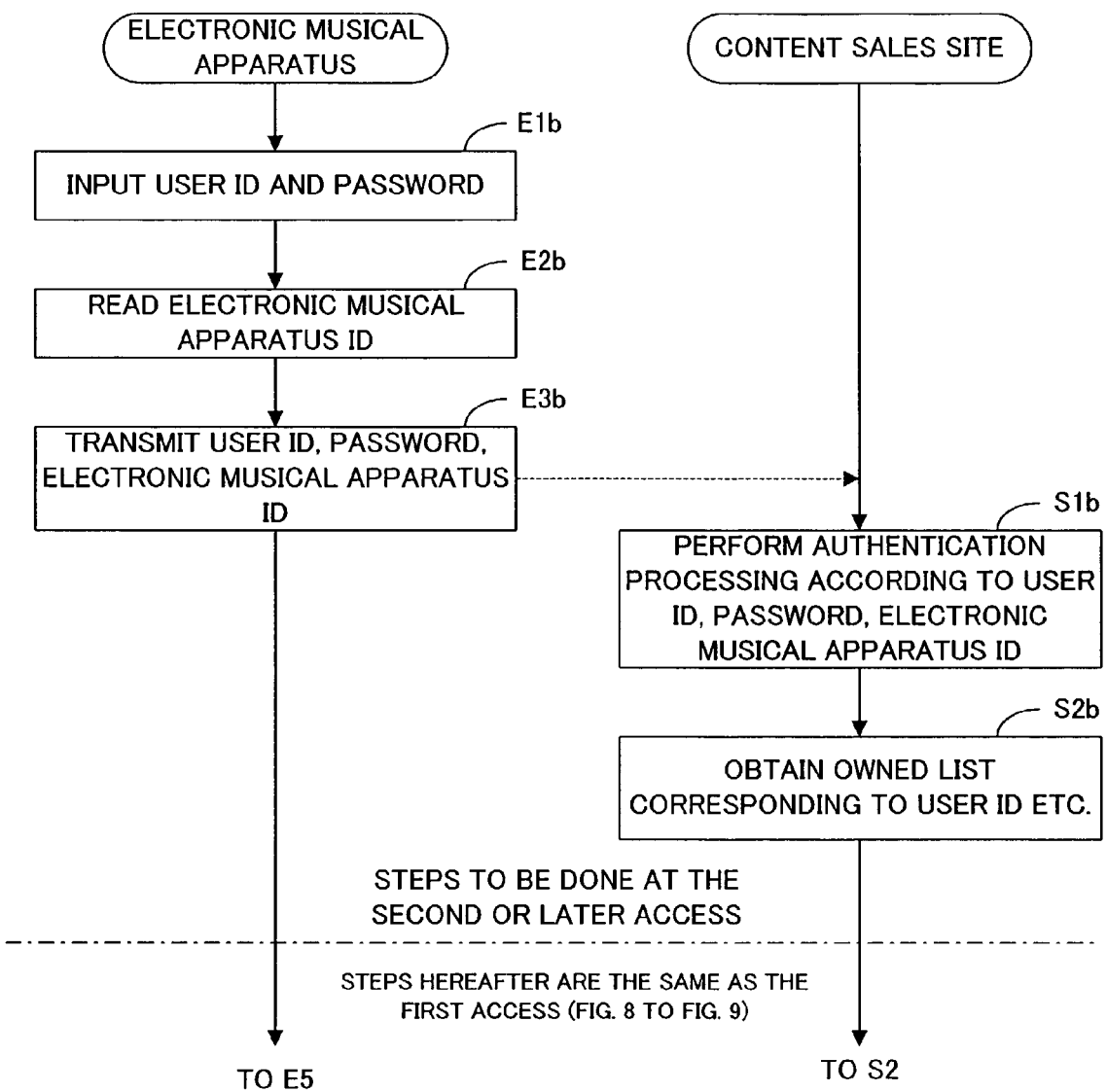
FIG. 10 is the other part of the flow chart showing the content sales processing according to the first embodiment of the present invention.

FIG. 10 is a flow chart illustrating "processing at the second or later access" performed at the second or later access from the electronic musical apparatus to the content sales site 1 in the content sales processing according to the first embodiment of the present invention. The processing is performed at the second or later access as a replacement for "processing at the first access" shown in FIG. 8.

At the time of the second or later access from the electronic musical apparatus to the content sales site 1, a user ID and a password are input to the system according to the operational procedure operated by the operators 34, 46 for inputting a user ID and a password (step E1b). Then according to the operational procedure for accessing the content sales site 1, an electronic musical apparatus ID is read from the ROMs 22, 43 (step E2b), and the user ID, the password and the electronic musical apparatus ID are transmitted to the content sales site 1 by the function of the content information transmitting section M4 (step E3b). Thereafter, the processing proceeds to a step where a search condition is input and transmitted to the content sales site 1 (step S2). The remainder of the processing is the same as the first access.

That is, content information of the content items owned by an electronic musical apparatus is stored in the content list storage area (13) as an owned content list UL at the first access (S1), and the list is updated every time a new item is distributed (S6), which eliminates the need for transmitting content information at the second or later access.

In the content sales site 1, by the function of the content list storage section V1, the authentication processing through user ID, password and electronic musical apparatus ID from an electronic musical apparatus is performed (step S1*b*). In this authentication processing, not only a user ID and a password but also an electronic musical apparatus ID must be presented, which blocks unauthorized access from users with fraudulently obtained user ID and password. If the access is not authenticated by the authentication processing, the electronic musical apparatus is notified that the access has been rejected. After the notification, the processing is immediately aborted, or the electronic musical apparatus is requested to re-transmit the user ID, the password, and the electronic musical apparatus ID.

If the authentication processing is successfully done, an owned content list UL corresponding to the authenticated user ID, password, and electronic musical apparatus ID is retrieved from the content list storage area (13) (step S2*b*). Thereafter the search step (S2) shown in FIG. 8 is performed. The remainder of the processing is the same as the first access.

[Charging Processing of the First Embodiment]

Figure 11:
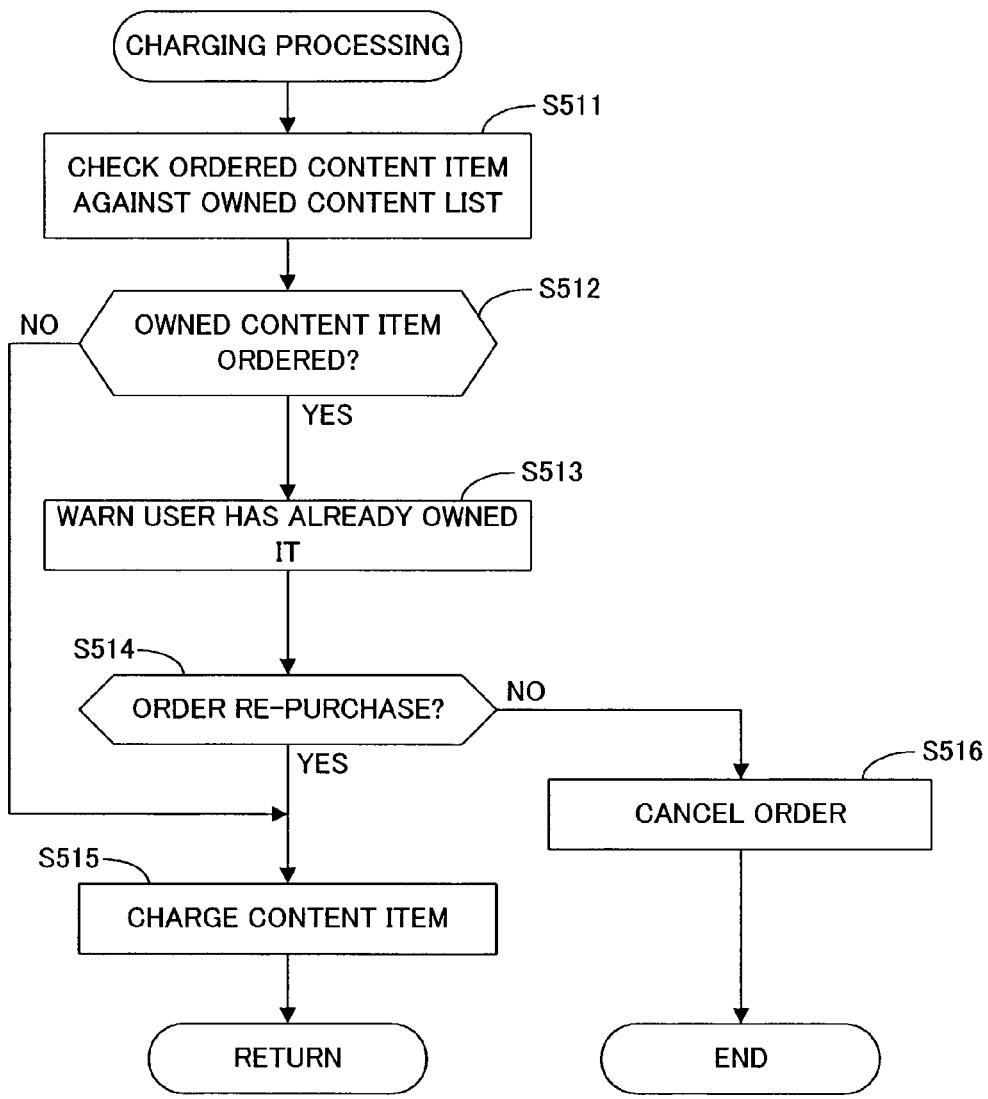
FIG. 11 is a flow chart showing charging processing conducted in the content sales processing according to the first embodiment of the present invention.

FIG. 11 is a flow chart illustrating the charging processing performed in the content sales processing according to the first embodiment of the present invention. Processes on this flowchart are performed at the charging processing step S5 (FIG. 9) on the side of the content sales site 1 in the content sales processing.

On receiving content identifying information and a purchase ordering command (E8) from an electronic musical apparatus, the content sales site 1 checks the content item ordered by the electronic musical apparatus against the owned content list UL retrieved from the owned content list storage section V1 (step S511) and determines whether the content item ordered by the electronic musical apparatus is one of the owned items (step S512), utilizing the function of the charging processing section V6.

If it is determined that the ordered item matches with one of those included in the owned content list UL, in other words, if one of the owned content items is ordered (S512→YES), a note warning the user that he/she has already owned it is displayed on the displays 36, 53 of the electronic musical apparatus (step S513). At the step S513, the purchase ordering buttons PR on the content list screen (FIG. 7) are turned to operable again in order to confirm that the user places an order for the content item.

Then, it is determined whether a repeat order is placed on the side of the electronic musical apparatus (step S514). If a repeat order is detected through the operation of the purchase ordering button PR, the processing determines to distribute the repeatedly ordered content item to the electronic musical apparatus and performs a process for charging the item (step S515). After the step S515, the step S6 of the content sales processing is performed.

If a repeat order is not given (e.g. the cancel button CN is operated, or the purchase ordering button PR is not operated within a fixed time period) (S514→NO), a process for canceling the purchase order given before (E8) is performed (step S516), and the processing performed by the content sales site is terminated.

[The Second Embodiment (Charging Processing)]

Figure 12:
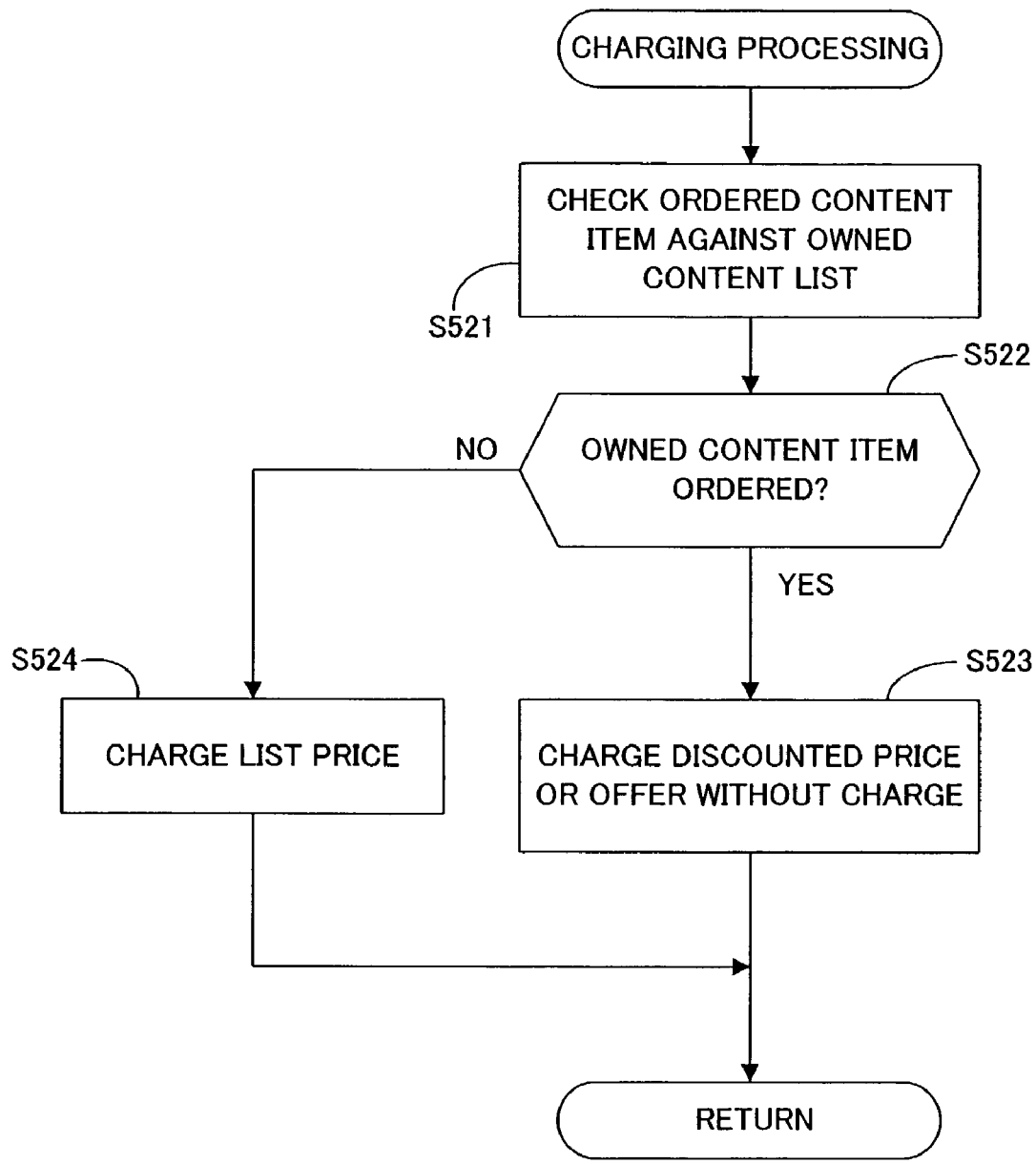
FIG. 12 is a flow chart showing characteristic part (charging processing) of the content sales processing according to the second embodiment of the present invention.

FIG. 12 is a flow chart illustrating characteristic part of the content sales processing according to the second embodiment of the present invention. The second embodiment of this invention has different steps in the charging processing from the first embodiment. Specifically, in the second embodiment as in the case of the first embodiment, the steps shown in FIG. 8 and FIG. 9 are performed at the first access, and at the second or later access the steps shown in FIG. 10 are performed, followed by steps of step E5, S2 and below shown in FIG. 8 and FIG. 9. In the second embodiment, however, performed at the charging processing step S5 (FIG. 9) is the processing shown in FIG. 12.

In the flow chart of the charging processing according to the second embodiment shown in FIG. 12, in response to the reception of the content identifying information and the purchase ordering command (E8) from the electronic musical apparatus, the content sales site 1 checks the content item ordered by the electronic musical apparatus against the owned content list UL retrieved from the owned content list storage section V1 by the function of the charging processing section V6 (step S521). It is then determined whether the electronic musical apparatus has ordered an owned content item (step S522).

If the ordered content item matches with one of those included in the owned content list UL and it is determined that the owned content item has been ordered (S522→YES), the content sales site 1 determines to distribute the ordered item which has been already owned by the electronic musical apparatus and performs a charging step which offers the ordered item at low cost (a discounted price) in which a certain percentage of discount is given or dose not charge for it (offering without charge) (step S523). When the latter manner (not charging) is taken, the content sales site 1 may be constructed so that owned content items are re-distributed at no charge as far as a cumulative number of times a user has purchased content items exceeds or does not exceed a specified number of times.

On the other hand, if it is determined that the ordered content item is not among those included in the owned content list UL, in other words, if it is determined that it is a new one (S522→NO), the content sales site 1 performs a step which charges the ordered item (step S524). After these steps (S523, S524), the content sales site 1 returns to the step S6 (FIG. 9) of the content sales processing.

[Modified Embodiments]

In the above embodiments, content information is comprised of a set of data items including content number, genre, title, composer name, lyric writer's name, and artist name, however, information held by the owned content list UL may be anything as far as each content item can be identified. Possible information includes content number assigned to each content item (content ID), file name of a content item, title of a content item, composer of a content item, and lyric writer of a content item. These items of information may be used singly or in combination.

In the embodiments, each electronic musical apparatus has an electronic musical apparatus ID, which is also stored in an owned content list stored on the side of the content sales site in order to be referred at the time of the authentication processing. This authentication processing, which performs authentication through not only a user ID and a password but also an electronic musical apparatus ID in order to block unauthorized access from users with fraudulently obtained user ID and password, serves to construct a content sales site with a very high level of security. However, the electronic musical apparatus ID may be omitted from the authentication processing because the authentication through only user ID and password can secure a certain extent of security.

In order to improve harmonization between content items stored on the side of an electronic musical apparatus and a list stored on the side of the content sales site, content information stored in the electronic musical apparatus may be transmitted to the content sales site at not only the first access but also the second and later accesses. In this occasion, content information may be transmitted at every access, or at every time an electronic musical apparatus has accessed the content sales site for specified times. It may also be transmitted at every time a set period of time has passed, or a newly purchased content item is added from purchased external media.

Not only the content information stored in one electronic musical apparatus of a user but also that stored in his/her other apparatuses may be integrally managed as the owned content of the user. In this case, every time a new electronic musical apparatus accesses the content sales site, content information stored in the new apparatus is transmitted to the content sales site, and the site adds the content information transmitted from the new apparatus to the owned content list which the content sales site has managed.

An electronic musical apparatus may not have a function of connecting directly to a communication network. In this occasion, the electronic musical apparatus may be connected to another personal computer or mobile communication terminal device, through which the electronic musical apparatus is connected to the communication network.

Electronic musical apparatuses are not limited to those illustrated as embodiments; for example, they may be a musical game machine or a karaoke unit.

What is claimed is:

1. A content sales server connected to electronic musical apparatuses over a communication network that allows communication among each other, comprising:
   a storage unit for storing a content database of a plurality of content items and an owned content list comprising owned content information describing content items owned by at least one user of an electronic musical apparatus, said owned content list associated with a user ID communicated from the electronic musical apparatus to the content sales site over the communication network;
   a processing unit adapted to
      search the plurality of content items stored in said content database for offerable content items in response to a request from said electronic musical apparatus, retrieve offerable content information describing the content items fulfilling the request and generate an offerable content list comprising the retrieved offerable content information describing offerable content items;
      refer to said owned content list specified by the user ID to detect offerable content information which describe the content items owned by the user of the electronic musical apparatus from among said offerable content list; and
      add owned information to the detected offerable content information to generate display data for displaying an offerable content list indicating which content items have been already owned by the user; and
   a transmitting unit for transmitting the generated display data to the electronic musical apparatus,
   wherein the processing unit is further adapted to
      notify the user of the electronic musical apparatus to confirm an order for a content item if the content item is owned by the user;
      distribute a content item to the electronic musical apparatus through the communication network in response to a request based on the offerable content list indicating which content items have been already owned by the user; and
      to update the owned content list stored in the storage unit in response to the distribution of the content item to the electronic musical apparatus wherein one or more content items are stored in and utilized by the electronic musical apparatus.

2. The content sales server according to claim 1, said processing unit further adapted to:
   retrieve owned content information of content items stored in said electronic musical apparatus; and
   generate said owned content list in accordance with the retrieved owned content information.

3. The content sales server according to claim 2, wherein said content items stored in said electronic musical apparatus are preset in said electronic musical apparatus.

4. The content sales server according to claim 2, wherein said content items stored in said electronic musical apparatus are obtained from media other than said sales site.

5. A content sales program, embodied on a computer-readable medium and applied to a content sales site which is connected to electronic musical apparatuses over a communication network that allows communication among each other and is provided with a memory for storing a content database of a plurality of content items and an owned content list comprising owned content information describing content items owned by at least one user of an electronic musical apparatus, said owned content list associated with a user ID communicated from the electronic musical apparatus to the content sales site over the communication network, said program causing the content sales site to execute a method comprising the steps of:
   searching the plurality of content items stored in said content database for offerable content items in response to a request from said electronic musical apparatus;
   retrieving offerable content information describing the content items fulfilling the request;
   generating an offerable content list comprising the retrieved offerable content information describing offerable content items;
   referring to said owned content list specified by the user ID to detect offerable content information which describe the content items owned by the user of the electronic musical apparatus from among said offerable content list;
   adding owned information to the detected offerable content information to generate display data for displaying an offerable content list indicating which content items have been already owned by the user;
   transmitting the generated display data to the electronic musical apparatus;
   notifying the user of the electronic musical apparatus to confirm an order for a content item if the content item is owned by the user;
   distributing a content item to the electronic musical apparatus through the communication network in response to a request based on the offerable content list indicating which content items have been already owned by the user; and updating the owner content list stored in the storage unit in response to distributing the content item to the electronic musical apparatus wherein one or more content items are stored in and utilized by the electronic musical apparatus.

6. The content sales program according to claim 5, said method further comprising the steps of:

retrieving owned content information of content items stored in said electronic musical apparatus; and generating said owned content list in accordance with the retrieved owned content information.

7. The content sales program according to claim 6, wherein said content items stored in said electronic musical apparatus are preset in said electronic musical apparatus.

8. The content sales program according to claim 6, wherein said content items stored in said electronic musical apparatus are obtained from media other than said sales site.

9. A content sales server connected to apparatuses for using content over a communication network that allows communication among each other, comprising:

a storage unit for storing a content database of a plurality of content items and an owned content list comprising owned content information describing content items owned by at least one user of an apparatus, said owned content list associated with a user ID communicated from the apparatus to the content sales site over the communication network;

a processing unit adapted to search the plurality of content items stored in said content database for offerable content items in response to a request from said apparatus, retrieve offerable content information describing the content items fulfilling the request and generate an offerable content list comprising the retrieved offerable content information describing offerable content items;

refer to said owned content list specified by the user ID to detect offerable content information which describe the content items owned by the user of the apparatus from among said offerable content list; and add owned information to the detected offerable content information to generate display data for displaying an offerable content list indicating which content items have been already owned by the user; and a transmitting unit for transmitting the generated display data to the apparatus, wherein the processing unit is further adapted to notify the user of the apparatus to confirm an order for a content item if the content item is owned by the user;

distribute a content item to the apparatus through the communication network in response to a request based on the offerable content list indicating which content items have been already owned by the user; and to update the owned content list stored in the storage unit in response to the distribution of the content item to the apparatus.

10. The content sales sever according to claim 9, said processing unit further adapted to:

retrieve owned content information of content items stored in said apparatus; and generate said owned content list in accordance with the retrieved owned content information.

11. The content sales server according to claim 10, wherein said content items stored in said apparatus are preset in said apparatus.

12. The content sales server according to claim 10, wherein said content items stored in said apparatus are obtained from media other than said sales site.

13. A content sales program, embodied on a computer-readable medium and applied to a content sales site which is connected to apparatuses for using content over a communication network that allows communication among each other and is provided with a memory for storing a content database of a plurality of content items and an owned content list comprising owned content information describing content items owned by at least one user of an apparatus, said owned content list associated with a user ID communicated from the apparatus to the content sales site over the communication network, said program causing the content sales site to execute a method comprising the steps of:

searching the plurality of content items stored in said content database for offerable content items in response to a request from said apparatus;

retrieving offerable content information describing the content items fulfilling the request;

generating an offerable content list comprising the retrieved offerable content information describing offerable content items;

referring to said owned content list specified by the user ID to detect offerable content information which describe the content items owned by the user of the apparatus from among said offerable content list;

adding owned information to the detected offerable content information to generate display data for displaying an offerable content list indicating which content items have been already owned by the user;

transmitting the generated display data to the apparatus;

notifying the user of the apparatus to confirm an order for a content item if the content item is owned by the user;

distributing a content item to the apparatus through the communication network in response to a request based on the offerable content list indicating which content items have been already owned by the user; and updating the owner content list stored in the storage unit in response to distributing the content item to the apparatus.

14. The content sales program according to claim 13, said method further comprising the steps of:

retrieving owned content information of content items stored in said apparatus; and generating said owned content list in accordance with the retrieved owned content information.

15. The content sales program according to claim 14, wherein said content items stored in said apparatus are preset in said apparatus.

16. The content sales program according to claim 14, wherein said content items stored in said apparatus are obtained from media other than said sales site.

* * * * *